(12) United States Patent
Kuhne et al.

(10) Patent No.: US 8,186,965 B2
(45) Date of Patent: May 29, 2012

(54) RECOVERY TIP TURBINE BLADE

(75) Inventors: Craig Miller Kuhne, Cincinnati, OH (US); Joseph Steven Bubnick, Cincinnati, OH (US); Alisha Vachhani, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 12/472,611

(22) Filed: May 27, 2009

(65) Prior Publication Data
US 2010/0303625 A1    Dec. 2, 2010

(51) Int. Cl.
   *B63H 1/26*    (2006.01)
   *F01D 5/20*    (2006.01)
(52) U.S. Cl. ............... 416/228; 415/173.1; 415/173.4
(58) Field of Classification Search ............ 415/173.1, 415/173.4; 416/228
   See application file for complete search history.

(56) References Cited

U.S. PATENT DOCUMENTS

| | | |
|---|---|---|
| 3,635,585 A | 1/1972 | Metzler |
| 3,781,129 A | 12/1973 | Aspinwall |
| 4,010,531 A | 3/1977 | Andersen et al. |
| 4,142,824 A | 3/1979 | Andersen |
| 4,390,320 A | 6/1983 | Eiswerth |
| 4,424,001 A | 1/1984 | North et al. |
| 4,606,701 A | 8/1986 | McClay et al. |
| 4,893,987 A | 1/1990 | Lee et al. |
| 4,940,388 A | 7/1990 | Lilleker et al. |
| 4,992,025 A | 2/1991 | Stroud et al. |
| 5,261,789 A | 11/1993 | Butts et al. |
| 5,282,721 A | 2/1994 | Kildea |
| 5,476,364 A | 12/1995 | Kildea |
| 5,503,527 A | 4/1996 | Lee et al. |
| 5,660,523 A | 8/1997 | Lee |
| 5,720,431 A | 2/1998 | Sellers et al. |
| 5,733,102 A | 3/1998 | Lee et al. |
| 6,039,531 A | 3/2000 | Suenaga et al. |
| 6,059,530 A | 5/2000 | Lee |
| 6,086,328 A | 7/2000 | Lee |
| 6,164,914 A | 12/2000 | Correia et al. |
| 6,179,556 B1 | 1/2001 | Bunker |
| 6,190,129 B1 | 2/2001 | Mayer et al. |
| 6,224,336 B1 | 5/2001 | Kercher |
| 6,382,913 B1 | 5/2002 | Lee et al. |
| 6,527,514 B2 | 3/2003 | Rueloffs |
| 6,554,575 B2 | 4/2003 | Leeke et al. |
| 6,595,749 B2 | 7/2003 | Lee et al. |
| 6,672,829 B1 | 1/2004 | Cherry et al. |
| 6,790,005 B2 | 9/2004 | Lee et al. |
| 7,281,894 B2 | 10/2007 | Lee et al. |
| 7,290,986 B2 | 11/2007 | Stegemiller et al. |
| 7,607,893 B2 * | 10/2009 | Lee et al. ............ 416/228 |
| 2007/0059173 A1 | 3/2007 | Lee et al. |

(Continued)

OTHER PUBLICATIONS

U.S. Appl. No. 11/507,119, filed Aug. 21, 2006, Klasing et al.

(Continued)

*Primary Examiner* — Michelle Mandala
(74) *Attorney, Agent, or Firm* — David J. Clement; Trego, Hines & Ladenheim, PLLC (57) ABSTRACT

A turbine blade includes an airfoil having first and second tip ribs extending along the opposite pressure and suction sides thereof. A tip baffle bifurcates the airfoil tip into two pockets, with a first pocket being laterally open at its aft end to recover leakage flow, and a second pocket being laterally closed.

22 Claims, 4 Drawing Sheets

U.S. PATENT DOCUMENTS

| | | |
|---|---|---|
| 2007/0059182 A1 | 3/2007 | Stegemiller et al. |
| 2008/0044289 A1 | 2/2008 | Klasing et al. |
| 2008/0044290 A1 | 2/2008 | Klasing et al. |
| 2008/0044291 A1 | 2/2008 | Lee et al. |
| 2008/0118363 A1 | 5/2008 | Lee et al. |

OTHER PUBLICATIONS

U.S. Appl. No. 11/507,120, filed Aug. 21, 2006, Klasing et al.

Mischo, B., "Flow Physics and Profiling of Recessed Blade Tips: Impact on Performance and Heat Load," ASME GT2006-91074, May 8-11, 2006, pp: 1-11.

General Electric Company, "First Stage High Pressure Tubine Blade," In public and commercial use in USA for more than one year before Apr. 1, 2009, 2 figures.

International Search Report issued in connection with corresponding PCT Application No. PCT/US2010/030413, Jun. 23, 2010.

* cited by examiner

RECOVERY TIP TURBINE BLADE

BACKGROUND OF THE INVENTION

The present invention relates generally to gas turbine engines, and, more specifically, to turbine blades therein.

In a gas turbine engine, air is pressurized in a compressor and mixed with fuel for generating combustion gases in a combustor. Various turbine stages extract energy from the combustion gases to power the engine and produce work.

A high pressure turbine (HPT) immediately follows the combustor and extracts energy from the hottest combustion gases to power the upstream compressor through one drive shaft. A low pressure turbine (LPT) follows the HPT and extracts additional energy from the combustion gases for powering another drive shaft. The LPT powers an upstream fan in a turbofan aircraft engine application, or powers an external shaft for marine and industrial applications.

Engine efficiency and specific fuel consumption (SFC) are paramount design objectives in modern gas turbine engines. The various turbine rotor blades and their corresponding nozzle vanes have precisely configured aerodynamic surfaces for controlling the velocity and pressure distributions thereover for maximizing aerodynamic efficiency.

The corresponding airfoils of the blades and vanes have generally concave pressure sides and generally convex suction sides extending axially in chord between opposite leading and trailing edges. The airfoil has a crescent profile in radial section, increasing rapidly in width from the leading edge to a maximum width region, and then decreasing in width gradually to the trailing edge.

The circumferentially or transversely opposite sides of the airfoils also extend radially in span from root to tip. The airfoils typically have thin sidewalls formed by casting of superalloy metals, with internal cooling circuits having various embodiments all specifically tailored for efficiently cooling the airfoils during operation while maximizing efficiency.

However, aerodynamic design of turbine airfoils is remarkably complex in view of the three dimensional (3D) configurations of the individual airfoils in complete rows thereof, and the correspondingly complex flow streams of the combustion gases channeled between the airfoils during operation. Adding to this complexity of design and environment are the special flow fields around the radially outer tips of the turbine blades which rotate at high speed inside a surrounding stationary shroud during operation.

The operating clearance or gap between the blade tips and the turbine shrouds should be as small as practical for minimizing leakage of the combustion gas flow therethrough while also permitting thermal expansion and contraction of the blades and shrouds without undesirable rubbing between the rotating tips and stationary shroud.

During operation, the blades in a turbine row drive the supporting rotor disk in rotation with the airfoil suction side leading the opposite airfoil pressure side. The airfoils typically twist from root to tip in the radial direction from the perimeter of the rotor disk, and the leading edges face upstream obliquely with the engine axial centerline axis to match the oblique discharge swirl angle of the cooperating nozzle vanes.

The combustion gases flow generally in the axial downstream direction, with a circumferential or tangential component first engaging the airfoil leading edges in one flow direction, and then leaving the airfoils over the trailing edges thereof in a different flow direction.

The pressure and suction sides of the airfoils have correspondingly different 3D profiles for maximizing differential pressure therebetween and energy extraction from the hot combustion gases. The concave pressure side and the convex suction side effect different velocity and pressure distributions thereover which correspondingly vary between the leading and trailing edges, and from root to tip. However, the combustion gases which leak over the airfoil tips in the required tip clearance perform little, if any, useful work.

Further complicating turbine blade design is the exposed blade tips which are therefore bathed in the combustion gases which leak thereover during operation, and require suitable cooling thereof for ensuring a long useful life of the turbine blades during operation.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil. And, these axial and radial flow variations are further compounded over the airfoil tip where the combustion gases leak between the pressure and suction sides of each airfoil.

Accordingly, the prior art is replete with various configurations of turbine blade tips addressing different problems and performance considerations including turbine efficiency, tip leakage, and tip cooling. These three important considerations are interdependent at least in part, but the complex 3D flow fields over the different pressure and suction sides at the airfoil tip and between the leading and trailing edges renders quite complex the evaluation thereof.

Furthermore, it is common practice to continually improve existing blade designs, but any change in blade design, and particularly in the tip, is interdependent with other blade features and might adversely affect the blade. Typical blade design requires careful balance of competing objectives and the careful evaluation of particular operating conditions, and this further complicates modern blade design.

Features which provide benefit in one blade design do not necessarily provide benefit in other designs for which they were not originally designed. Predictability of performance of individual features is illusory when introduced in different blades designed for different operating conditions.

Even the typical operating conditions of a given gas turbine engine vary over output power from takeoff to cruise, and performance of the turbine blades also varies thereover, as well as over the typical change in tip clearance.

However, modern computational fluid dynamics (CFD) includes powerful software that improves the ability to mathematically analyze complex 3D flow streams in gas turbine engines and provides a mechanism from which further improvements in turbine blade design may be realized.

Various blade permutations may now be more readily analyzed to predict performance thereof, and whether design changes are beneficial or not.

Accordingly, it is desired to improve turbine blade tip design by reducing tip flow leakage, or increasing turbine efficiency, or increasing energy extraction, or improving tip cooling, or any combination of these factors either separately or together.

BRIEF DESCRIPTION OF THE INVENTION

A turbine blade includes an airfoil having first and second tip ribs extending along the opposite pressure and suction sides thereof. A tip baffle bifurcates the airfoil tip into two pockets, with a first pocket being laterally open at its aft end to recover leakage flow, and a second pocket being laterally closed.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
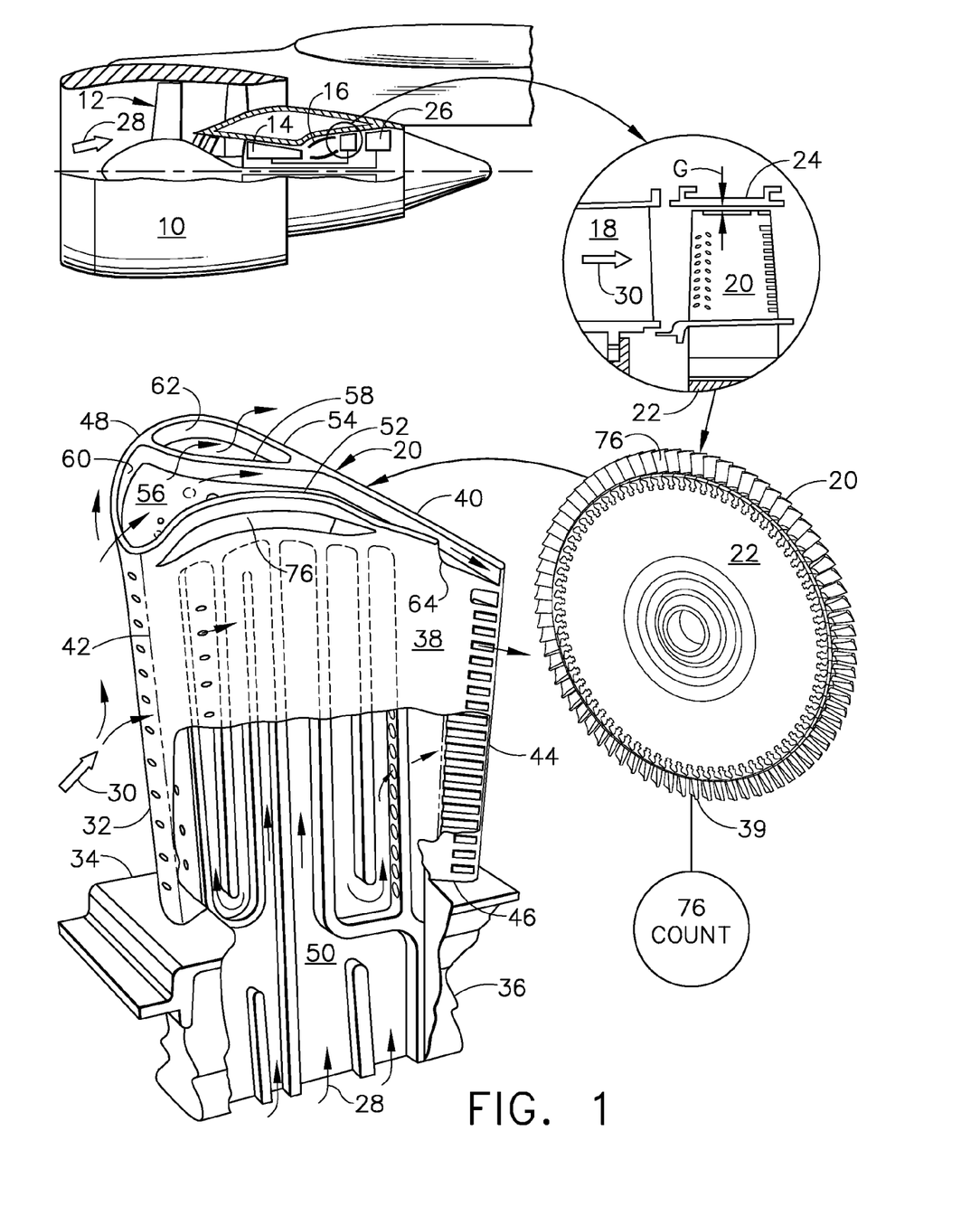
FIG. 1 is a schematic view of an exemplary turbofan gas turbine aircraft engine including a single-stage HPT having a row of turbine rotor blades.

Illustrated schematically in FIG. 1 is an exemplary turbofan gas turbine engine 10 mounted to an aircraft wing (shown in part) for powering an aircraft in flight.

The engine 10 is axisymmetrical about a longitudinal or axial centerline axis, and includes in serial flow communication a fan 12, compressor 14, and combustor 16 followed by a single-stage HPT. The HPT includes a nozzle 18 and a row of first stage turbine rotor blades 20 extending radially outwardly from a supporting rotor disk 22.

The row of blades 20 is mounted inside a surrounding turbine shroud 24 with a small radial clearance or tip gap G therebetween. And, a multistage LPT 26 follows the single stage HPT.

During operation, air 28 enters the engine and is pressurized in the compressor and mixed with fuel in the combustor. Hot combustion gases 30 then leave the combustor to power the HPT and LPT which in turn power the compressor and fan.

The exemplary turbine blade 20 is typically cast from superalloy metal with an airfoil 32, platform 34 at the root thereof, and a supporting dovetail 36 in an integral, one-piece assembly.

The dovetail 36 may have any conventional form, such as the axial-entry dovetail illustrated, which mounts the blade in a corresponding dovetail slot in the perimeter of the supporting rotor disk 22. The disk 22 holds a full row of the blades spaced circumferentially apart from each other to define interblade flow passages therebetween.

During operation, the combustion gases 30 are discharged from the combustor 16 downstream through the nozzle 18 and between the corresponding blades 20 which extract energy therefrom for powering the supporting rotor disk. The individual platform 34 provides a radially inner boundary for the combustion gases and adjoins adjacent platforms in the full row of turbine blades.

Figure 2:
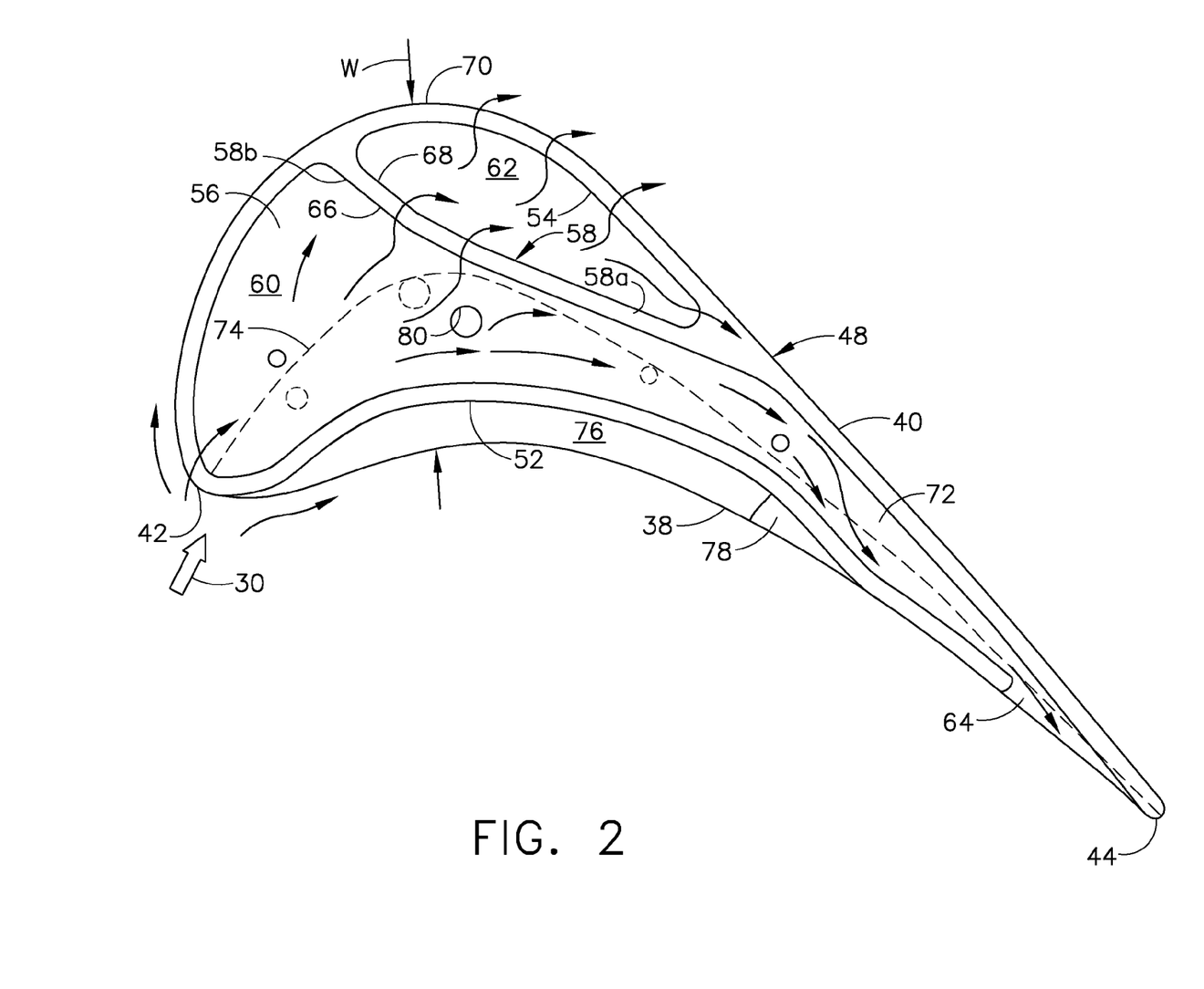
FIG. 2 is top planiform view of the exemplary turbine blade shown in FIG. 1.

The airfoil 32 illustrated in FIGS. 1 and 2 includes circumferentially or transversely opposite pressure and suction sides 38,40 extending axially in chord between opposite leading and trailing edges 42,44 and extends radially in span from the airfoil root 46 to terminate in a radially outer tip cap, or tip, 48. The airfoil pressure side 38 is generally concave between the leading and trailing edges and complements the generally convex airfoil suction side 40 between the leading and trailing edges.

The external surfaces of the pressure and suction sides 38,40 of the airfoil have the typical crescent shape or profile conventionally configured for effecting corresponding velocity and pressure distributions of the combustion gases thereover during operation for maximizing energy extraction from the gases.

The airfoil 32 is typically hollow and includes an internal cooling circuit 50 which may have any conventional configuration, such as the illustrated two three-pass serpentine circuits that terminate in corresponding impingement flow passages behind the leading edge and in front of the trailing edge. The cooling circuit extends through the platform and dovetail with corresponding inlets in the base of the dovetail for receiving pressurized cooling air 28 from the compressor 14 in any conventional manner.

In this way, the blade is internally cooled from root to tip and between the leading and trailing edges by the internal cooling air 28 which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoil 32 shown initially in FIG. 1 has a precisely configured 3D external profile which correspondingly affects the velocity and pressure distributions of the combustion gases 30 as they flow in the axial downstream direction from leading to trailing edges 42,44. The blades are attached to the perimeter of the supporting disk and rotate during operation, which generates secondary flow fields in the combustion gases with typically radially outwardly migration of the combustion gases along the span of the airfoil.

Furthermore, the relative pressure of the combustion gases on the pressure side 38 of the airfoil is higher than the pressure along the suction side of the airfoil, and along with the corresponding rotation of the blade during operation introduces further secondary or tertiary affects in the combustion gas flow field as it flows radially up and over the exposed airfoil tip 48 during operation.

The turbine rotor blade 20 described above may be conventional in configuration and operation for use in a gas turbine engine, including for example the first stage of the HPT.

The otherwise conventional blade may then be specifically modified as described hereinbelow for improving performance thereof, especially in new or derivative turbofan engines.

For example, the unmodified, conventional parent blade has enjoyed successful commercial use in the USA for more than one year in an HPT having a row of eighty turbine blades.

However, one improvement in blade design may be obtained by reducing the number or count of turbine blades 20 in the single-stage row to only seventy-six (76) of such blades, with seventy-six corresponding airfoils 32, for substantially the same amount of work or energy extraction.

Because fewer turbine blades are used, the axial chord length of the airfoils may be correspondingly increased, along with corresponding changes in the 3D contours of the pressure and suction sides 38,40.

Additionally, further performance improvements may be obtained by specifically modifying the airfoil tip 48 for improved cooperation with the first and second squealer tip ribs 52,54 which are radially integral extensions of the airfoil pressure and suction sides, or sidewalls, 38,40, respectively, and conform in profile or curvature therewith.

Those pressure and suction sides have corresponding 3D contours which affect the velocity and pressure distributions of the combustion gases during operation, and the small squealer rib 52,54 extensions thereof assist in extracting energy from those gases.

The first or pressure side rib 52 conforms chordally with the shape or profile of the concave pressure side 38 of the airfoil, and correspondingly, the second or suction side rib 54 conforms in chordal profile with the convex suction side 40 of the airfoil.

As shown in FIGS. 1 and 2 the airfoil also includes a tip floor 56 which bridges or spans the opposite sidewalls 38,40 to enclose the internal cooling circuit 50. The two ribs 52,54 extend radially outwardly from the common tip floor 56 as continuations or extensions of the corresponding sidewalls of the airfoil which define the opposite pressure and suction side surfaces thereof.

Between the leading and trailing edges, the two ribs 52,54 are spaced transversely or circumferentially apart to include an axially short tip baffle or rib 58 which extends axially or chordally between the leading and trailing edges.

The tip baffle 58 bifurcates the airfoil tip 48 between the bounding ribs 52,54 to define a first tip cavity or pocket 60 extending chordally along the first rib 52, and to also define a corresponding second tip cavity or pocket 62 extending chordally along the second rib 54.

The two ribs 52,54 are integrally joined together at the leading edge 42 of the airfoil, but are not joined together at the trailing edge 44, and instead are spaced transversely apart to define an aft outlet 64 for the first pocket 60.

Whereas the second pocket 62 is fully bound laterally by the tip baffle 58 and corresponding portion of the second rib 54, and is therefore laterally closed, the first pocket 60 is almost fully laterally bound by the first rib 52, tip baffle 58, and corresponding portions of the second rib 54, but is specifically open at its aft outlet 64.

Both pockets 60,62 are fully open radially outwardly above the common tip floor 56, and the second pocket 62 is fully laterally closed around its perimeter, but the first pocket 60 is additionally laterally open at its aft end in flow communication with the aft outlet 64.

The second rib 54 extends continuously from the leading edge 42 to the trailing edge 44; whereas the first rib 52 also extends continuously from the leading edge 42, but terminates short of the trailing edge 44, and is interrupted by the aft outlet 64.

That aft outlet 64 is simply defined by stopping the first rib 52 over its full radial height axially short of the trailing edge to effect a correspondingly small outlet niche or slot extending chordally between the first rib 52 and the trailing edge 44, while also extending transversely between the pressure side 38 and the opposite suction-side second rib 54.

Like the squealer ribs 52,54, the tip baffle 58 has a rectangular transverse cross section of similar width and height, with a first side 66 laterally facing the corresponding inboard side of the first rib 52 to define the middle portion of the first pocket 60. The forward and aft portions of the first pocket 60 are similarly bounded by the corresponding portions of those inboard sides so that the pocket 60 follows the concave contour of the pressure side from said leading edge 42 to terminate at the aft outlet 64 at the trailing edge 44.

The tip baffle 58 also includes an opposite second side 68 laterally facing the corresponding middle portion of the inboard side of the second rib 54 to laterally bound the closed second pocket 62.

The airfoil tip 48 is illustrated in radial cross section in FIG. 2 with the typical crescent profile and increases in transverse width W aft from the leading edge 42 to a maximum width at a hump 70 in the convex suction side 40. From the hump, the airfoil then converges aft to the trailing edge 44 as required for maximizing aerodynamic performance.

The tip baffle 58 commences along the suction side of the airfoil chordally between the leading edge 42 and the hump 70, with a suitable intermediate spacing therebetween. The baffle 58 terminates along the suction side chordally between the hump 70 and the trailing edge 44 at a substantial intermediate spacing therebetween to maximize the width of the first pocket 60 in the thin trailing edge region.

FIG. 1 illustrates in radial section the turbine blade 20 suitably mounted inside the turbine shroud 24, shown in relevant part, to provide a relatively small radial clearance or gap G therebetween. The combustion gases 30 during operation leak over the pressure side of the airfoil, through the radial clearance, and are discharged over the lower pressure suction side of the airfoil.

The first and second ribs 52,54 and the tip baffle 58 spaced circumferentially therebetween extend in common height or span from the tip floor 56 to provide a substantially constant radial gap with the inner surface of the surrounding turbine shroud 54. The radially outer surfaces of the airfoil tip are therefore coplanar with each other for providing a close, sealing fit with the surrounding shroud.

As indicated above in the Background section, the 3D configuration of the turbine blade is highly complex and the turbine airfoil is operated in the highly complex 3D flow field of the combustion gases 30 which are split around the airfoil leading edge during operation.

FIGS. 1 and 2 illustrate exemplary streamlines of the split gas flow around the aerodynamic profile of the airfoil tip. CFD analysis has been performed on this exemplary embodiment to confirm performance improvements therefrom compared with a reference design having a single tip cavity without the bifurcating tip baffle therein.

The introduction of the tip baffle may be used in specific designs for improving turbine efficiency as well as reducing leakage of the combustion gases over the airfoil tip through the tip-shroud clearance.

Turbine efficiency is based on the ability of the airfoil surfaces to extract energy from the differential pressure in the combustion gases acting over the pressure and suction sides of the airfoil from root to tip and between the leading and trailing edges. The introduction of the tip baffle 58 provides additional surface area at the blade tip against which the tip flow may perform additional work on the blade. The tip baffle also provides an additional seal like the two squealer tip ribs 52,54 themselves for reducing tip flow leakage.

Tip leakage includes both axial and circumferential components in view of the 3D configuration of the airfoil tip. The combustion gases 30 engage the airfoil around its leading edge 42 both in axial and circumferential directions due to the oblique inlet angle from the upstream turbine nozzle 18. The tip baffle 58 preferably commences near the hump of the suction side of the airfoil as specifically controlled by the incident flow streamlines.

It is desired to place the tip baffle 58 so that it captures incident flow streamlines over the forward portion of the second rib 54 to funnel them inside the first tip pocket 60 bounded by the tip baffle 58 itself. The leakage gases are funneled through the first pocket 60 in secondary flow fields that pressurize the first pocket while being guided aft along the tip baffle itself. The so pressurized first pocket 60 increases turbine efficiency by extracting additional energy from the tip baffle itself, and also discourages further leakage over the tip gap by the increased pressure therein.

Correspondingly, some of the leakage gases captured by the first pocket 60 will flow over the tip baffle 58 into the second pocket 62 and are further funneled in the aft direction therein. The leakage gases from both pockets 60,62 will then be discharged in large part over the suction-side second rib 54 in the downstream direction.

However, the introduction of the aft outlet 64 for the first pocket 60 provides additional advantages, including the partial recovery of tip gases back to the inter-blade flow passages which terminate at the airfoil trailing edges 44. The aft outlet is located on the pressure side of the airfoil, and tip leakage recovered therethrough is returned to the flow passages upstream of the passage throats which are defined between the trailing edge normal to the suction side of the next adjacent airfoil.

As shown in FIG. 2, the first pocket 60 converges aft along the tip baffle 58 from the upstream suction side, and terminates in an aft portion defining an aft flow channel 72 spanning or bridging the first and second ribs 52,54 in the thin or narrow trailing edge region of the airfoil.

The aft channel 72 follows the first rib 52 behind the tip baffle 58 and has a substantially constant width converging slightly to the aft outlet 64. Whereas the first pocket 60 is initially wide and converges in flow area at a relatively high rate over its forward portion or half, it then transitions to a narrow middle portion along the tip baffle 58 terminating in the similarly narrow aft channel 72.

The narrow aft portion of the first pocket 60 extends over half the chord length upstream from the trailing edge, and has a substantially constant width that converges aft with small change within about 5%.

The first pocket 60 therefore effects a flow tunnel converging aft to the aft outlet 64 through which tip flow leakage is captured, channeled, turned, and returned or recovered back to the airfoil pressure side.

The converging flow area in the first pocket 60 effects a flow restriction which in turn helps pressurize the first pocket for aerodynamically blocking tip flow leakage, yet still allows controlled discharge of the captured pocket flow through the pressure-side aft outlet 64.

Accordingly, the specifically configured and located tip baffle 58 provides a simple mechanism to reduce both axial and circumferential leakage of the combustion gases as they flow over the airfoil tip during operation, while correspondingly improving turbine efficiency.

Furthermore, the introduction of the tip baffle 58 biases the tip leakage more aft along the chord of the airfoil where the airfoil tapers to the trailing edge which reduces the loss in efficiency due to that very leakage itself.

In the preferred embodiment illustrated in FIG. 2, the tip baffle 58 is positioned near the transverse middle between the opposite sides of the airfoil for maximizing the local widths of the two pockets 60,62. If the pocket width is too small, the leakage gases may simply overflow the pocket without generating significant local flow fields therein and thereby limiting performance improvement from the baffle.

For this reason, the baffle 58 terminates suitably upstream from the thin trailing edge of the airfoil for maintaining a suitable minimum width of both pockets 60,62 in their aft regions for maximizing the performance advantages thereof.

In the FIG. 2 embodiment, the tip baffle 58 includes an aft portion 58a transversely bifurcating the tip 48 along or near the camber line 74 between the ribs 52,54, and a forward portion 58b diverging from the camber line 74 to blend with the second rib 54. The baffle forward portion 58b preferably bows laterally from the aft portion 58a toward the second pocket 62 to blend with the second rib 54.

The aft portion 58a is preferably chordally straight or linear, whereas the forward portion 58b is convex toward the first pocket 60 for increasing the rate of aft convergence thereof.

To further enhance performance of the airfoil tip and its cooperation with the tip baffle 58, the airfoil pressure side 38 includes a tip shelf 76 recessed laterally inwardly to offset laterally inwardly the first rib 52 between the leading edge 42 and the aft outlet 64. The shelf 76 also correspondingly narrows the first pocket 60 along the tip baffle 58.

The tip shelf 76 has a conventional configuration, and terminates in a conventional ramp 78 to reduce flow stagnation, and improve durability.

The aft channel 72 correspondingly follows the contour of the tip shelf 76 along the offset first rib 52, and blends with the first rib 52 aft of the tip shelf 76 in a substantially constant width as described above.

In the exemplary embodiment of the turbine blade illustrated in FIGS. 1 and 2 the tip ribs 52,54 and tip baffle 58 have similar rectangular transverse sections extending radially outwardly from the common tip floor 56, and may be about 25 mils (0.6 mm) wide The height of the ribs and pockets may be about 56 mils (1.4 mm). And, the minimum width of the two pockets 60,62 may be about 44 mils (1.1 mm).

As shown in FIG. 2, the tip floor 56 preferably includes a plurality of holes 80 disposed solely inside the first pocket 60, and chordally spaced apart along the tip baffle 58 and aft channel 72. The tip floor inside the second pocket 62 is solid and imperforate without any holes.

Six tip holes 80 are illustrated in FIG. 2, and three of which holes provide outlets in flow communication with the internal cooling circuit 50 for discharging spent cooling air therefrom. The second hole 80 closest to the leading edge and the last hole closest to the trailing edge have relatively small diameters and act as small purge holes having large restriction with low flow.

The fourth hole 80 behind the leading edge is a relatively large dust hole with higher discharge flow for effectively discharging any dust entrained in the cooling air, while minimizing accumulation thereof around the hole which would otherwise block flow discharge. The first, third, and fifth tip holes are brazed closed.

The contour of the first pocket 60 and the tip holes 80 therein allow for a special method of making the turbine blade 20 with attendant advantages.

It should be noted that the more complex a blade design becomes, the more complex will be the ability to economically make the blade. Modern turbine blades, like the blade 20, are made from superalloy metals typically cast with preferred metallurgical structure.

The blade 20, including its integral airfoil 32, platform 34, and dovetail 36, is therefore cast from molten metal using a conventional lost-wax process, suitably modified for the special configuration of the tip 48.

Figure 3:
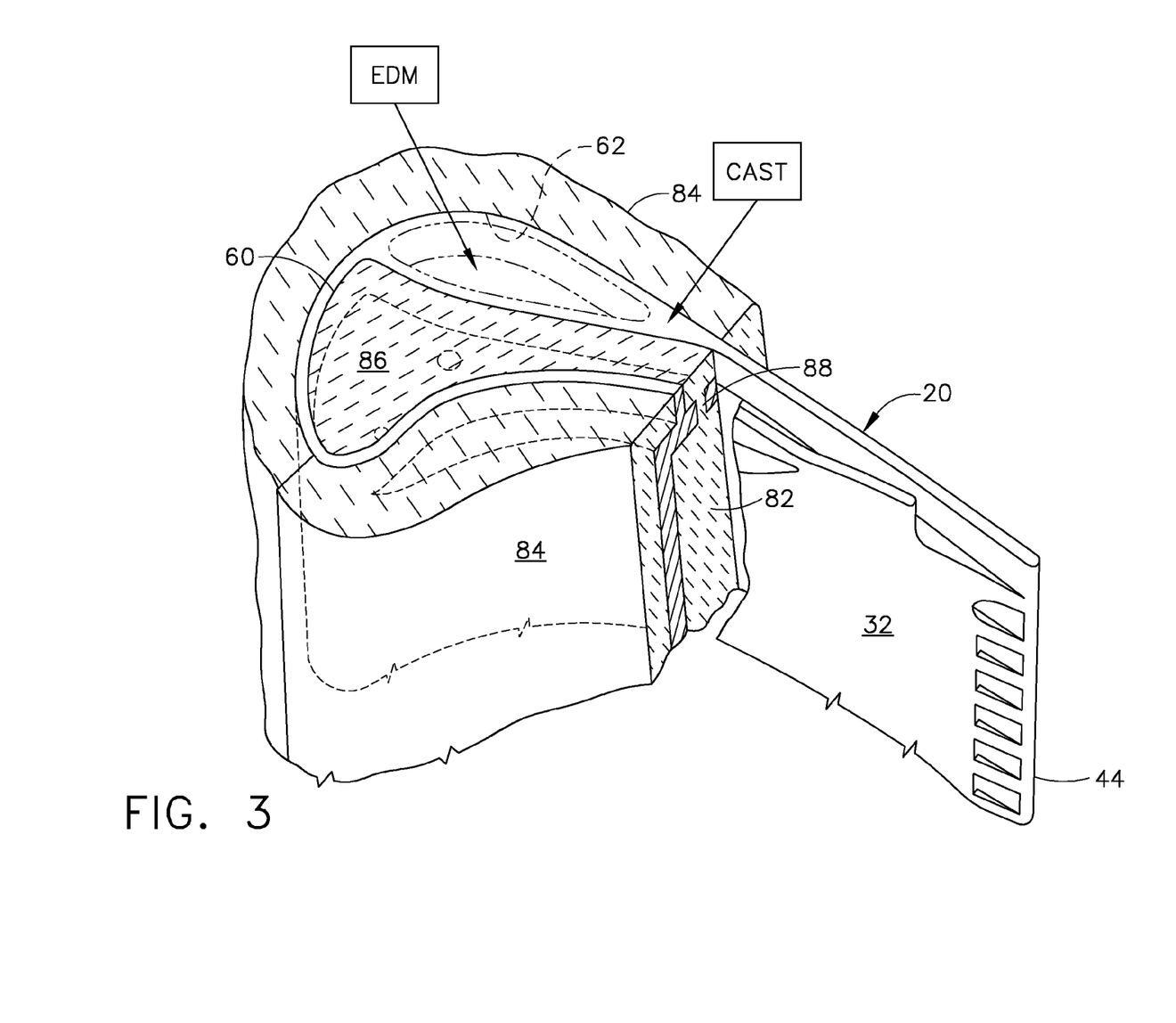
FIG. 3 is a schematic view of an exemplary method of making the turbine blade shown in FIG. 1.

Fundamental to blade casting is the use of a conventional ceramic internal core 82 shown schematically in part inside the airfoil 32 of FIG. 3. The internal core is configured to define the complex internal flow passages of the blade, including its airfoil.

Cooperating with the internal core 82, are a pair of external ceramic shells 84 which are suitably spaced from the internal core to initially contain a wax version of the final blade.

In the conventional lost wax method, the wax is removed to create a void between the core and shell, and molten metal fills the void to form the desired turbine blade, and its thin wall features.

The internal core 82 is integrally joined to a ceramic cap 86 by four corresponding short ceramic rods 88 extending through respective ones of the first, third, fifth, and sixth tip holes 80. The cap 86 is configured to match the desired configuration of the first pocket 86 and is offset above the internal core 82 to form the thin-walled tip floor 56.

The cap 86 for the first pocket 60 is relatively large and wide to improve casting yield, and is accurately supported by the four ceramic rods 88, which later define the four corresponding tip holes 80.

After casting, the first tip hole is brazed closed and replaced by the second tip hole formed through the tip floor by conventional electrical discharge machining (EDM) to more accurately control its size, and flow therethrough. The large third tip hole is also brazed closed and replaced by the fourth EDM hole to eliminate change due to thermal expansion of the core rod 88. And, the fifth tip hole is brazed closed as not required for cooling.

Since the second pocket 62 is relatively small and separate and distinct from the first pocket 60, it would otherwise require a separate, small ceramic cap therefor. Such a small cap increases the difficulty of casting, and must be suitably supported, which further increases the difficulty of casting, and would lead to low casting yields.

Accordingly, the second pocket 62 is not initially cast in the blade, but solely the first pocket 60 is cast, with its ceramic cap 86 disposed therein. The cap 86 and resulting first pocket are then bound by casting metal filling that completely fills the second pocket 62, and therefore no second pocket is yet formed.

Instead, cast metal may the be subsequently removed from the location of the second pocket 62, by any suitable process, including for example conventional electrical discharge machining (EDM).

In this way, the large first pocket 60 may be accurately cast, whereas the small second pocket 62 may be accurately machined in a subsequent operation.

This method of making the turbine blade 20, including its special tip 48 having the bifurcating tip baffle 58, therefore becomes not only possible, but practical for achieving the improved benefits of the improved tip.

Improved performance and efficiency of the turbine blade row are measured in fractions of a percent which require precise accuracy of the cooperating tip features. The preferred method makes possible these performance improvements, which might otherwise not be possible or practical.

Fundamental to the first embodiment of the turbine blade illustrated in FIGS. 1-3 is the bifurcating tip baffle 58 that divides the airfoil tip into only two distinct pocket portions 60,62, with the first pocket 60 having a continuous perimeter except at its aft end which is laterally open, with the second pocket 62 being laterally closed around its full perimeter.

The large first pocket 60 covers a majority of the surface area of the tip, and extends continuously from the leading edge 42 to the trailing edge 44. In contrast, the small second pocket 62 covers a minor surface area of the tip to straddle forward and aft the airfoil hump 70 having maximum tip width.

This basic embodiment may have variations subject to detailed design and analysis under the specific operating conditions of the intended engine use.

Figure 4:
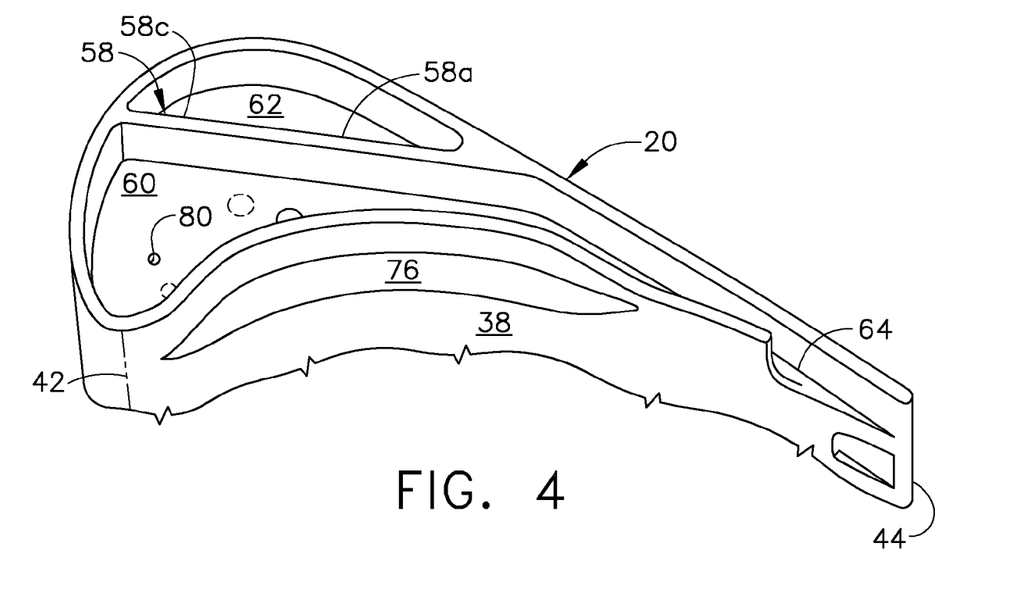
FIG. 4 is a isometric view of the airfoil tip shown in FIG. 1 in accordance with an alternate embodiment.

For example, FIG. 4 illustrates an alternate embodiment of the turbine blade 20 in which the tip baffle has the same substantially straight or linear aft portion 58a, but the forward portion 58c is similarly straight or linear and colinear with the aft portion 58a to blend with the second rib 54. The straight tip baffle 58 is generally parallel with the straight chord of the airfoil tip between the leading and trailing edges 42,44.

Figure 5:
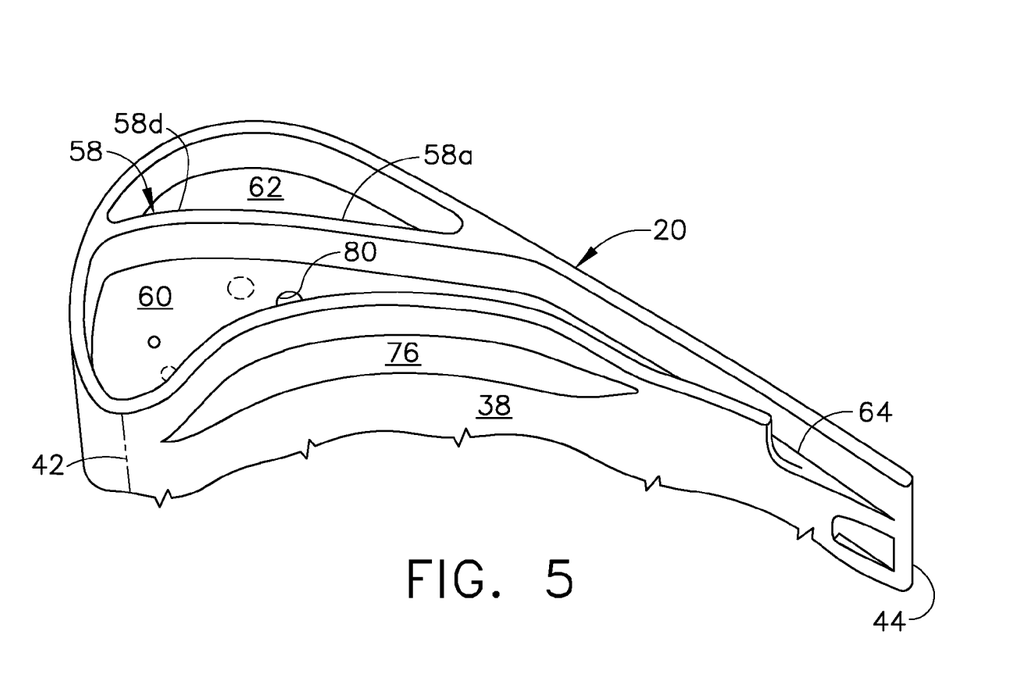
FIG. 5 is an isometric view, like FIG. 4, of the airfoil tip in accordance with another embodiment.

FIG. 5 illustrates yet another embodiment of the blade 20 in which the baffle aft portion 58a is again substantially straight, but wherein the baffle forward portion 58d bows laterally from the aft portion 58a toward the first pocket 60 to blend with the second rib 54.

Whereas the baffle forward portion 58b in FIG. 2 is convex in the first pocket 60, the baffle forward portion 58d in FIG. 5 is concave in the first pocket 60, with the baffle forward portion 58c in FIG. 4 being straight and an intermediate embodiment therebetween.

However, as indicated above, the flow field over the airfoil tip is highly complex and three-dimensional and subject to the high rotary velocity of the rotating blade and the varying pressure and velocity distributions over the pressure and suction sides of the airfoil.

The flow streamlines are therefore subject to these complex operating conditions, and analysis predicts enhanced performance of the first embodiment shown in FIG. 2 under its operating conditions.

Any similar benefits from the second and third embodiments shown in FIGS. 4 and 5 are subject to the particular operating conditions of the engine, and are therefore subject to corresponding detail design to ensure their efficacy.

The fundamental purpose of the squealer ribs 52,54 is to allow for tip rubbing with the surrounding turbine shroud while minimizing the radial tip clearance and flow leakage therethrough.

The addition of the specially configured and located middle tip baffle 58 bifurcates the tip into two pockets only, and introduces additional vortex flow thereover to effect aerodynamic blockage and decrease tip leakage flow.

The tip baffle cooperates with the aft-open first pocket 60 to locally channel and turn the captured tip flow and return or recover that flow back to the airfoil pressure side for generating additional blade torque on the supporting rotor disk for increasing turbine efficiency.

A particular advantage of this recovery tip turbine blade is its enhanced performance for tip clearance derivative. The radial clearance between the airfoil tip and the surrounding turbine shroud is not static or constant, but varies during operation and over blade life.

Analysis predicts improved performance of the recovery tip over a range of tip gaps G; with the tip clearance derivative being less sensitive when compared with a reference tip configuration without the improvements.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
an airfoil, platform, and integral dovetail;
said airfoil having opposite pressure and suction sides extending in chord between leading and trailing edges and extending in span from root to tip, wherein said pressure side is concave and said suction side is convex, wherein said airfoil increases in width aft from said leading edge to a maximum width at a hump in said suction side, and then converges to said trailing edge;
said tip including first and second ribs extending from a tip floor along said pressure and suction sides, respectively;
said first and second ribs are joined together at said leading edge and spaced transversely apart at said trailing edge to define an aft outlet, and a tip baffle extends chordally between said ribs to define a first pocket along said first rib laterally open at said aft outlet, and also defining a laterally closed second pocket along said second rib, wherein said tip baffle commences between said leading edge and hump and terminates between said hump and trailing edge; and
said first pocket converges aft along said tip baffle and terminates in an aft flow channel spanning said first and second ribs.

2. A blade according to claim 1 wherein said tip baffle includes a first side facing said first rib to define said first pocket following said concave contour of said pressure side from said leading edge to terminate at said aft outlet at said trailing edge, and an opposite second side facing said second rib to laterally bound said closed second pocket.

3. A blade according to claim 2 wherein said tip baffle includes an aft portion transversely bifurcating said tip along a camber line between said ribs, and a forward portion diverging from said camber line to blend with said second rib.

4. A blade according to claim 3 wherein said tip floor includes a plurality of holes chordally spaced apart along said tip baffle 58 and aft channel.

5. A blade according to claim 4 wherein said airfoil pressure side includes a tip shelf recessed laterally inwardly to offset laterally inwardly said first rib between said leading edge and said aft outlet, and correspondingly narrow said first pocket along said tip baffle.

6. A blade according to claim 5 wherein said aft channel follows said tip shelf along said offset first rib, and blends with said first rib aft of said tip shelf in a substantially constant width.

7. A blade according to claim 5 wherein said baffle forward portion bows laterally from said aft portion toward said second pocket to blend with said second rib.

8. A blade according to claim 5 wherein said baffle forward portion is colinear with said aft portion to blend with said second rib.

9. A blade according to claim 5 wherein said baffle forward portion bows laterally from said aft portion toward said first pocket to blend with said second rib.

10. A turbine blade comprising an airfoil tip having a pressure-side first rib joined to a suction-side second rib at a leading edge and spaced transversely apart at an opposite trailing edge to define an aft outlet, and a tip baffle extends chordally between said ribs to define a first pocket along said first rib laterally open at said aft outlet, and also defining a laterally closed second pocket along said second rib; wherein:
said airfoil increases in width aft from said leading edge to a maximum width at a hump in said suction side, and then converges to said trailing edge;
said tip baffle commences between said leading edge and hump and terminates between said hump and trailing edge; and
said first pocket converges aft along said tip baffle and terminates in an aft flow channel spanning said first and second ribs.

11. A blade according to claim 10 further including an airfoil having a concave pressure side and an opposite convex suction side, and said tip baffle includes a first side facing said first rib to define said first pocket following said concave contour of said pressure side from said leading edge to terminate at said aft outlet at said trailing edge, and an opposite second side facing said second rib to laterally bound said closed second pocket.

12. A blade according to claim 11 wherein said airfoil further includes a tip floor from which said first and second ribs and tip baffle extend in common height, and said first pocket is wide between said first rib and tip baffle and terminates in said aft channel being commonly narrow aft of said tip baffle.

13. A blade according to claim 12 wherein said tip floor includes a plurality of holes chordally spaced apart along said tip baffle 58 and aft channel.

14. A blade according to claim 12 wherein said tip baffle includes an aft portion transversely bifurcating said tip along a camber line between said ribs, and a forward portion diverging from said camber line to blend with said second rib.

15. A blade according to claim 14 wherein said baffle forward portion bows laterally from said aft portion toward said second pocket to blend with said second rib.

16. A blade according to claim 14 wherein said baffle forward portion is colinear with said aft portion to blend with said second rib.

17. A blade according to claim 14 wherein said baffle forward portion bows laterally from said aft portion toward said first pocket to blend with said second rib.

18. A blade according to claim 12 wherein said airfoil pressure side includes a tip shelf recessed laterally inwardly to offset laterally inwardly said first rib between said leading edge and said aft outlet, and correspondingly narrow said first pocket along said tip baffle.

19. A blade according to claim 18 wherein said aft channel follows said tip shelf along said offset first rib, and blends with said first rib aft of said tip shelf in a substantially constant width.

20. A plurality of turbine blades according to claim 12 arranged in a row around a supporting rotor disk, and consisting of seventy-six airfoils.

21. A method of making said turbine blade according to claim 12 comprising:
casting said airfoil with a ceramic cap inside said first pocket and bound by casting metal filling said second pocket; and
removing said cast metal from said second pocket.

22. A method according to claim 21 further comprising casting said airfoil with an internal ceramic core joined to said cap by an integral ceramic rod.

* * * * *